June 18, 1946. J. E. FERGUSON ET AL 2,402,387
GLASS BLOCK DEHYDRATING MECHANISM
Filed March 4, 1942 3 Sheets-Sheet 3

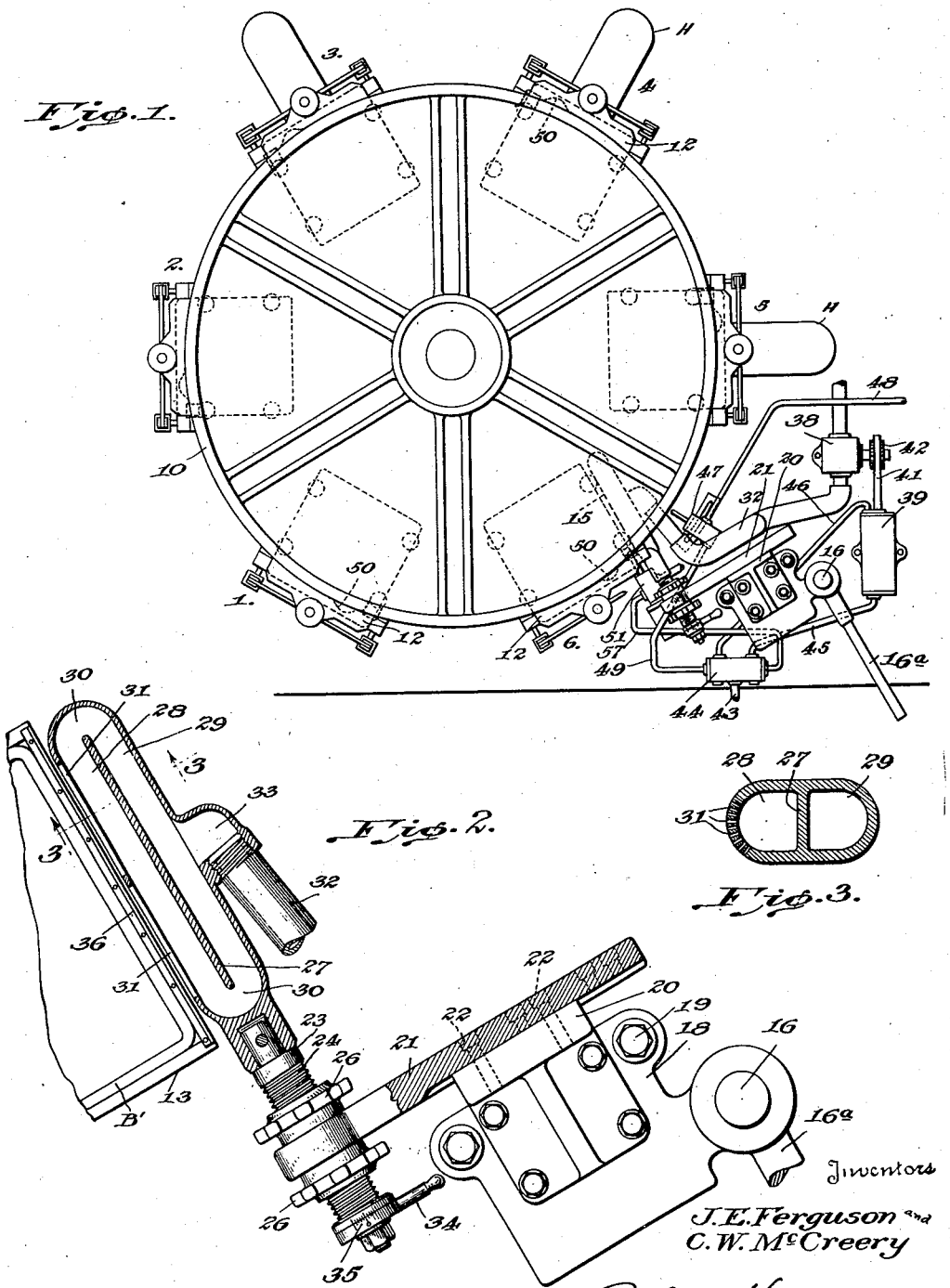

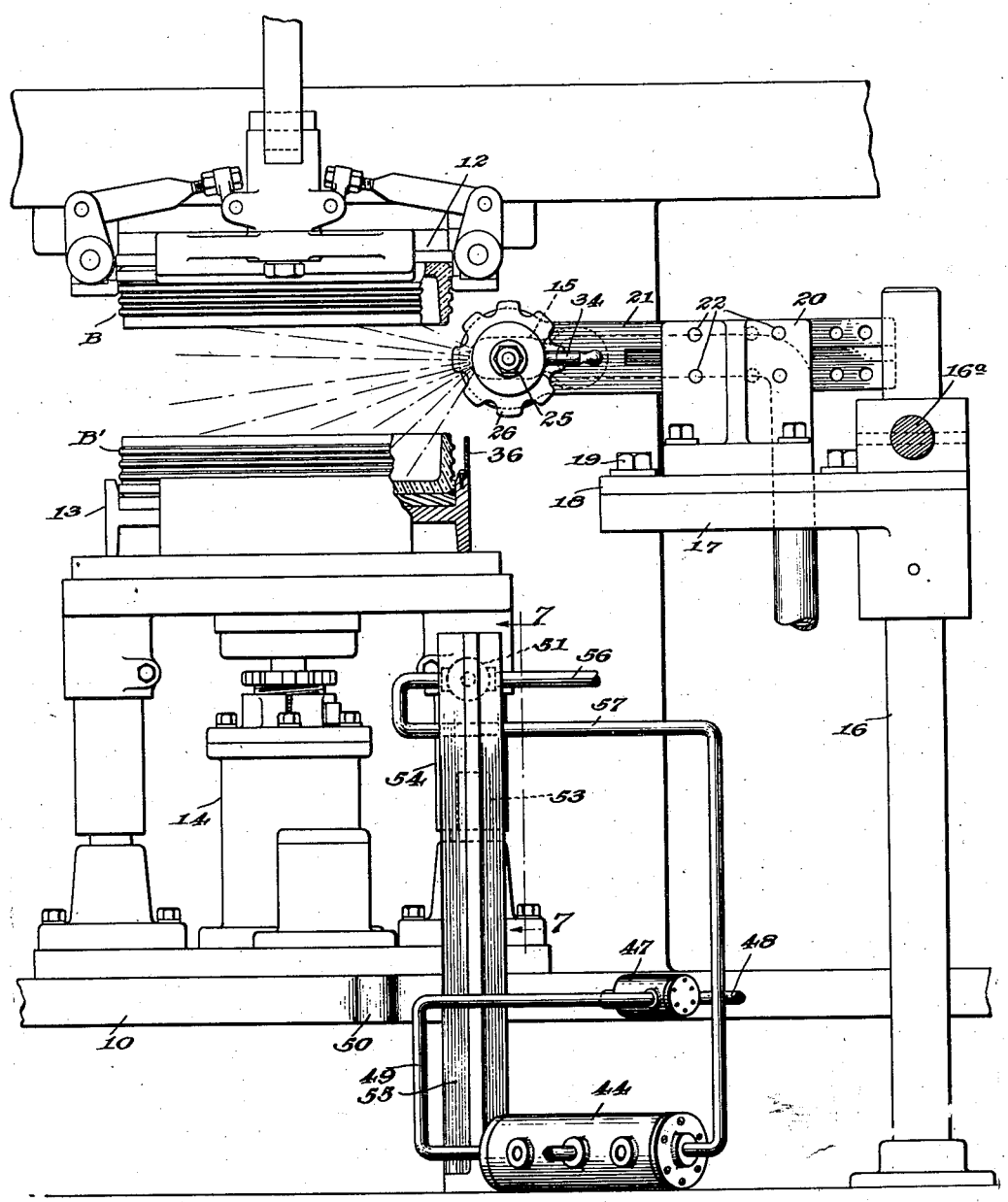

Inventors
J. E. Ferguson and
C. W. McCreery

By Rule and Hoge
Attorneys

Patented June 18, 1946

2,402,387

UNITED STATES PATENT OFFICE 2,402,387

GLASS BLOCK DEHYDRATING MECHANISM

John E. Ferguson and Cecil W. McCreery, Muncie, Ind., assignors to Owens-Illinois Glass Company, a corporation of Ohio Application March 4, 1942, Serial No. 433,354

3 Claims. (Cl. 49—1)

Our invention relates to apparatus for making hollow articles comprising separate sections which are sealed together, and comprises means for expelling the atmospheric air from said articles and substituting dehydrated air or other gas before the articles are sealed. The invention as herein illustrated and described is particularly adapted for introducing dehydrated air into hollow building blocks immediately before the sections are sealed together, thereby reducing the moisture content within the sealed blocks and preventing condensation of moisture on the inner surfaces. The invention, however, is not limited to this particular use.

An object of the invention is to provide novel and improved mechanism for supplying dehydrated air or the like to hollow blocks mounted on the rotating carriage of a sealing machine, such mechanism including an air nozzle mounted separate from the carriage.

A further object of the invention is to provide novel means by which the dehydrated air may be injected into the hollow sections of a block during their movement toward each other and the flow of air continued till the sections have been brought close together.

Other objects of the invention will appear hereinafter.

Referring to the accompanying drawings:

Fig. 1 is a plan view of a machine for sealing glass blocks, provided with mechanism for supplying dehydrated air or other gas to the blocks in accordance with our invention.

Fig. 2 is a sectional plan view of the air nozzle and its supporting means.

Fig. 3 is a section through the nozzle at the line 3—3 on Fig. 2.

Fig. 4 is a part-sectional elevation of the machine, parts being broken away.

Figure 5:
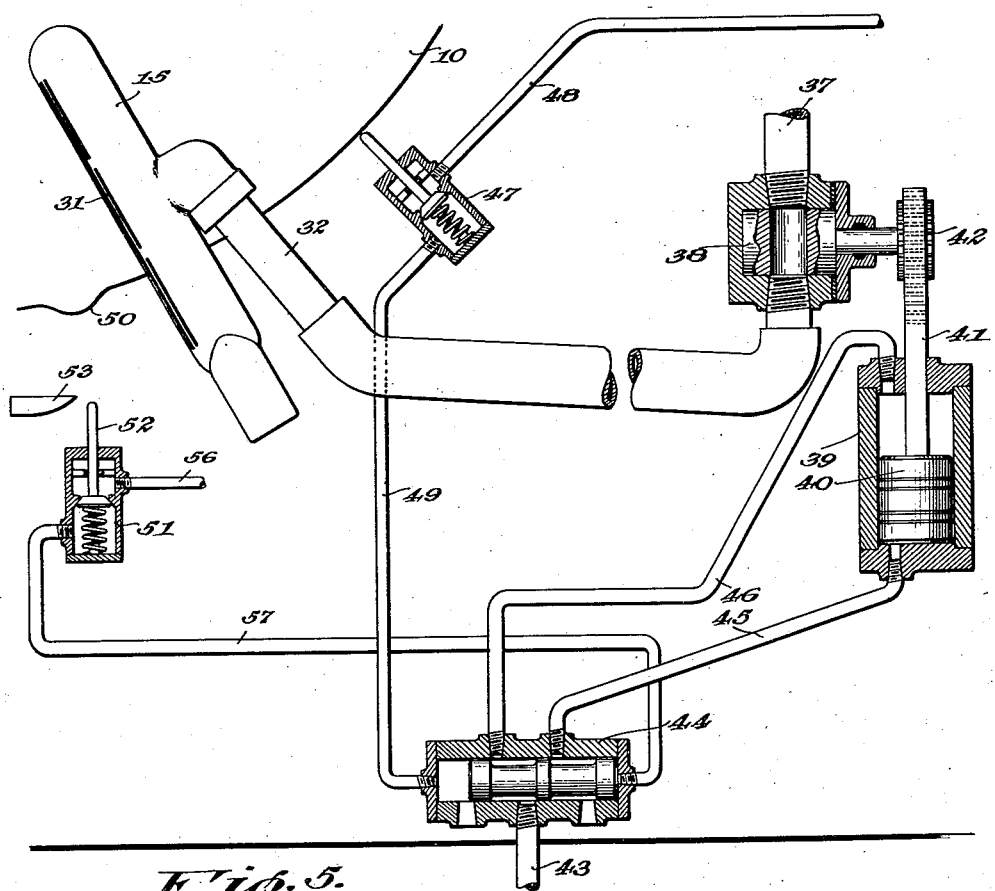
Fig. 5 is a part-sectional plan view showing the air nozzle and the mechanism for controlling the air supply thereto.

The machine herein shown comprises a carriage 10 on which are mounted sealing units arranged in an annular series and each comprising work holders in which the glass block sections are held while being brought together and sealed. The carriage is rotated intermittently step by step in a conventional manner to bring the units in succession to stations symmetrically arranged around the axis of rotation, including an unloading station 1, a loading station 2 at which the block sections are placed on the machine, heating stations 3, 4, and 5 at which devices H are provided for heating the blocks and softening the edges which are to be sealed together, and a sealing station 6 at which the blocks are brought together and sealed. The blower is also located at station 6. The upper and lower sections B and B' of the blocks are mounted respectively in holders 12 and 13. At station 6 a piston motor 14, which may be air operated, moves the holder 13 upward and brings the block sections into sealing engagement.

Any desired conventional mechanism may be employed for controlling the operation of the motors 14. Such mechanism may consist of hand-operated valves for controlling the supply of air to the motors as shown, for example, in the patent to Blau, No. 2,238,153, April 15, 1941. Reference may be had also to the patent to Eastus, No. 2,244,291, June 3, 1941, which patent relates to a glass block sealing machine comprising a carriage intermittently rotated about a vertical axis and comprising air-operated piston motors on the carriage. This patent contains a full disclosure of means for supplying air to the motors and automatically controlling their operation in timed relation to the movements of the mold carriage.

Figure 6:
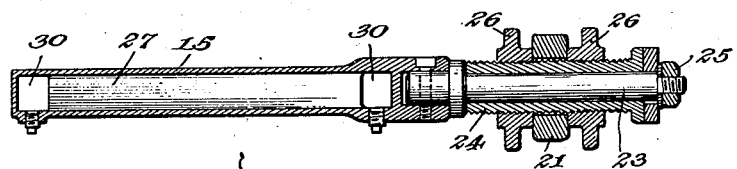
Fig. 6 is a longitudinal section of the nozzle.

The means for introducing dehydrated air or other gas into the hollow block sections prior to the closing and sealing operation comprises an air nozzle 15 having a stationary mounting separate from the mold carriage. This includes a post or column 16 to which is attached an arm 17 carrying a plate 18 secured thereto by bolts 19. A bracket 20 mounted on the plate 18 carries a horizontal arm 21 splined thereon for lengthwise adjustment and secured in adjusted position by screw bolts 22. The nozzle 15 has a shank 23 (Fig. 6) in the form of a detachable rod. A sleeve 24 having its exterior surface screw threaded, is mounted on said shank and secured by a clamping nut 25. The sleeve 24 extends freely through an opening in the arm 21. Clamping nuts 26 threaded on the sleeve 24, clamp the nozzle to the arm 21 after adjustment to any desired position. The post 16 may be pivotally mounted and provided with an arm 16ª for swinging the blower mechanism toward and from the carriage 10.

Referring to Figs. 2 and 3, the nozzle 15, which as shown, may be in the form of a somewhat flattened tube, approximately elliptical in cross section, is closed at both ends and is provided with an integral interior web 27 extending lengthwise thereof and dividing the nozzle into compartments 28 and 29. The web terminates a short distance from each end of the nozzle, thereby forming passageways 30 (Figs. 2 and 6) providing communication between the compartments 28 and 29 while the web serves as a baffle for directing the air which is passing through the nozzle. A fan-shaped series of parallel slots 31 formed in the front face of the nozzle and extending lengthwise thereof, provide discharge outlets. The air or gas is supplied to the nozzle through a pressure pipe line including a pipe 32 leading to a port 33 which opens into the compartment 29 at a point intermediate the ends of the nozzle and preferably about midway between the ends as shown.

The construction of the nozzle as just described, provides for an even distribution of the air or gas and a substantially uniform discharge at all points along the nozzle, the gas being radiated from the nozzle and fanned outwardly to enter the hollow block sections as indicated by broken lines in Fig. 4. In this manner the atmospheric air in said sections is effectively removed and replaced by the dehydrated air or other gas from the nozzle while the latter is positioned between the sections of the block. It will be noted that the upper holder 12 with the block section B moves in a plane above that of the nozzle while the path of the lower holder and block section B' is below the nozzle. Thus during each indexing operation the block sections which are approaching the sealing station 6, traverse the nozzle, passing respectively above and below the nozzle. When the carriage is arrested at the sealing station, the nozzle is closely adjacent to and extends along the side of the block sections. The blowing of the dehydrated air preferably is commenced, in the manner hereinafter described, as the carriage is brought into a position in which the nozzle can direct the dehydrated air between the separated block sections and is continued until the carriage has been arrested and the section B' moved upward to or adjacent to the sealing position.

A nozzle of the construction disclosed overcomes difficulties experienced with the use of a nozzle having its outlet at one end thereof, and provides for a more satisfactory and effective displacement of the atmospheric air and substitution of the dehydrated air or other gas. The nozzle 15 is rotatably adjustable about its longitudinal axis by means of a handle 34, the position of adjustment being indicated by a scale 35. A shield 36 (Fig. 4) is carried on the holder 13 in position to be interposed between the nozzle and the block section B' as the latter moves upward and thereby prevents the direct impingement of the air against the exterior surface of the glass. Undue cooling is thus prevented.

The mechanism for controlling the supply of dehydrated air or gas to the nozzle 15 will now be described. Referring to Fig. 5, the gas is supplied from any suitable source through a pipe 37 to a gas control valve 38 from which the pipe 32 extends to the nozzle. The valve 38 is actuated by an air operated piston motor comprising a cylinder 39, piston 40 and piston rod 41. The latter is extended and formed with rack teeth to engage a pinion 42 on the stem of the valve 38. Air under pressure for operating the piston motor is supplied through an air pressure pipe 43 to a spool valve 44. Pressure pipes 45 and 46 lead from the valve 44 to the lower and upper ends respectively of the motor cylinder 39. When air under pressure is supplied through the pipe 46 to the motor cylinder, the piston is lowered and the valve 38 opened for supplying the dehydrated air or gas to the nozzle.

Movement of the valve 44 into position thus to supply air through pipe 46 is under the control of a poppet valve 47 which controls the supply of air under pressure from a pipe 48 to a pipe 49 leading to the valve 44. The poppet valve 47 is normally opened momentarily during each indexing movement of the carriage by means of a cam lobe 50 or other actuating device on the carriage, there being a cam lobe for each head, positioned and timed to actuate the valve shortly before the indexing movement is completed. The dehydrated air is thus discharged through the nozzle while the latter is directly between the block sections.

Figure 7:
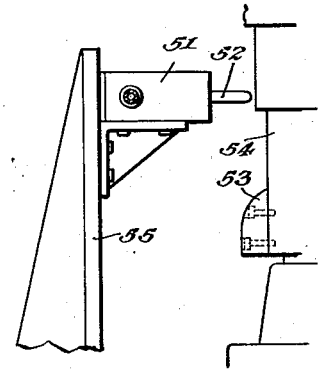
Fig. 7 is a sectional elevation at the line 7—7 on Fig. 4.

The valve 44 is reversed to cut off the supply of air to the nozzle, preferably just before the lower block section B' has reached its sealing position, such reversal being under the control of a poppet valve 51. This valve includes a valve stem 52 in the path of a boss 53 (Figs. 4, 5, 7) which serves as a cam for opening the valve. This cam is mounted on a lifting frame 54 which carries the mold block holder 13. The valve 51 has a stationary mounting on a standard 55. When tht valve 51 is opened by its cam, air pressure from a supply pipe 56 leading to the valve is transmitted from the valve through a pipe 57 to the right-hand end of the spool valve 44, thereby reversing it and causing a reversal of the motor piston 40, whereby the valve 38 is closed.

Modifications may be resorted to within the spirit and scope of our invention.

We claim:

1. A machine for sealing together the hollow sections of a rectangular hollow glass block, said machine comprising a carriage rotatable about a vertical axis, holders on the carriage for said sections, said holders being arranged one above the other and comprising means for holding said sections with the cavities therein facing each other, means for moving and guiding one of said holders toward the other in a predetermined path and thereby bringing the sections together, a nozzle, means for holding the nozzle at one side of and close to said path in position to extend lengthwise of said sections while the latter are held in said positions by the holders, means for supplying a gas under pressure to the nozzle, and causing it to blow the gas into said hollow sections while they are being brought together, said nozzle being provided with discharge apertures arranged to direct the issuing gas in predetermined directions such that gas is projected from the apertures directly into the cavities in said sections as they are being moved together, the means for supplying gas to the nozzle comprising a pressure supply line, a gas control valve in said line, a motor, means providing operating connections between the motor and valve, a motor control valve, pressure pipes extending from the motor control valve to the motor, a pressure pipe leading to the motor control valve, and automatic means for effecting the operation of the motor control valve and thereby supplying pressure through the motor control valve to the motor and causing said motor to open said gas control valve and supply gas through the nozzle as the carriage is brought to a sealing station, said automatic means including a control device rotating with the carriage, means operated by said control device for causing operation of the motor control valve, and separate control means operable automatically as the said block sections are brought together to cause a reversal of the motor control valve and thereby reverse said motor and cause it to close said first mentioned valve.

2. The combination of a carriage rotatable about a vertical axis, holders for holding the sections of a hollow block which are to be sealed together, said holders being mounted for rotation with the carriage and arranged to hold one block section spaced above the other, a lifting device for lifting the lower holder, means for guiding the lower holder in a predetermined path and thereby bringing the lower block section into sealing engagement with the upper section, a nozzle, means for holding the nozzle in a predetermined position adjacent to and outside of said path, a pipe line through which gas under pressure is supplied to the nozzle, a gas control valve in said pipe line, a motor, means providing operating connections between said gas control valve and the motor, a motor control valve, conduits providing communication between the motor control valve and the motor, pressure lines extending to the motor control valve, poppet valves in said pressure lines respectively, a pressure supply pipe extending to the motor control valve and brought into communication with said conduits alternatively by the operation of the motor control valve, means on the carriage for operating one of said poppet valves and causing operation of the motor control valve and thereby causing the motor to open the said gas control valve as the block sections approach a sealing station, and means actuated by said lifting device for operating the other poppet valve and causing a reversal of the motor control valve and thereby causing the motor to close the gas control valve as the block sections are brought together.

3. Apparatus for welding together hollow sections of a glass block, comprising holders including means for holding said sections spaced apart with their interiors facing each other, a support on which said holders are mounted, means for moving one said holder toward the other while said other is held stationary relative to said support, and thereby bringing the said sections into sealing engagement, means for blowing gas into said sections and displacing atmospheric air while said sections are being brought together, said blowing means comprising a nozzle, means for holding the nozzle close to the stationary holder and in a stationary position relative thereto with the nozzle extending along one side of the pair of block sections, said nozzle being formed with discharge apertures divergently directed toward the interiors of the block sections, and a shield carried by said moving holder and movable therewith into position to intercept the blast of gas from the nozzle as the said sections approach each other and thereby prevent direct impingement of the said gas on the exterior surfaces of said sections.

JOHN E. FERGUSON.
CECIL W. McCREERY.